(12) United States Patent
Sundberg

(10) Patent No.: US 8,144,610 B2
(45) Date of Patent: Mar. 27, 2012

(54) METHOD AND SYSTEM FOR UPLINK ESTABLISHMENT IN A WIRELESS CELLULAR COMMUNICATION

(75) Inventor: Krister Sundberg, Sollentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 801 days.

(21) Appl. No.: 11/910,845

(22) PCT Filed: Apr. 6, 2005

(86) PCT No.: PCT/IB2005/051122
§ 371 (c)(1),
(2), (4) Date: Oct. 5, 2007

(87) PCT Pub. No.: WO2006/106382
PCT Pub. Date: Oct. 12, 2006

(65) Prior Publication Data
US 2009/0073890 A1    Mar. 19, 2009

(51) Int. Cl.
*H04L 12/26* (2006.01)
(52) U.S. Cl. ......... 370/252; 370/349; 370/352; 370/401
(58) Field of Classification Search .................. 370/252, 370/349, 352
See application file for complete search history.

(56) References Cited

U.S. PATENT DOCUMENTS

| | | | | |
|---|---|---|---|---|
| 4,872,157 | A * | 10/1989 | Hemmady et al. | 370/400 |
| 6,674,765 | B1 * | 1/2004 | Chuah et al. | 370/458 |
| 6,693,892 | B1 * | 2/2004 | Rinne et al. | 370/348 |
| 2002/0012322 | A1 * | 1/2002 | Rooney | 370/252 |
| 2002/0112047 | A1 * | 8/2002 | Kushwaha et al. | 709/223 |
| 2002/0168962 | A1 * | 11/2002 | Kurakake et al. | 455/411 |
| 2003/0039237 | A1 * | 2/2003 | Forslow | 370/352 |
| 2004/0184461 | A1 | 9/2004 | Forssell | |
| 2004/0252674 | A1 * | 12/2004 | Soininen et al. | 370/352 |
| 2005/0037714 | A1 * | 2/2005 | Maucksch et al. | 455/67.16 |
| 2005/0141541 | A1 * | 6/2005 | Cuny et al. | 370/437 |
| 2007/0123284 | A1 * | 5/2007 | Schliwa-Bertling et al. | 455/518 |

FOREIGN PATENT DOCUMENTS

| | | |
|---|---|---|
| EP | 0994603 A2 | 4/2000 |
| JP | H08-033020 | 2/1996 |
| WO | WO 2004102997 A1 | 11/2004 |

OTHER PUBLICATIONS

Soltan et al. "improvement of the multipoint-to-point link of the GSM system" Feb. 1995, IEEE, vol. 31, No. 3.*

Kenth Fredholm, Kristian Nilsson, "Implementing an application for communication and quality measurements over UMTS networks", LiTH-ISY-EX-3369-2003 Linkoping 2003.

Hossam Fattah, Cyril Leung, "An Overview of Scheduling Algorithms in Wireless Multimedia Networks", IEEE Wireless Communications, pp. 76-83, Jun. 2002.

(Continued)

*Primary Examiner* — Ricky Ngo
*Assistant Examiner* — Rasheed Gidado (57) ABSTRACT

The present invention relates to wireless communications. More especially it relates to wireless packet data communications. Particularly it relates to latency reduction by distinguishing connection initiation of circuit switched and packet switched connections, respectively.

10 Claims, 2 Drawing Sheets

OTHER PUBLICATIONS

3GPP TS 04.60 v8.25.0 $3^{rd}$ Generation Partnership Project (3GPP) : Technical Specification Group GSM/EDGE Radio Access Network, General Packet Radio Service (GPRS), Mobile Station (MS)—Base Station System (BSS) interface, Radio Link Control/ Medium Access Control (RLC/MAC) protocol, (Release 1999), France, Sep. 2004 Paragraph 7.1.2.1.1.

3GPP TS 04.08 v7.21.0 $3^{rd}$ Generation Partnership Project (3GPP) : Technical Specification Group Core Network, Mobile radio interface layer 3 specification, (Release 1998), France, Dec. 2003 Paragraph 3.5.2.1.2.

3GPP TS 44.060 v5.13.0 $3^{rd}$ Generation Partnership Project (3GPP) : Technical Specification Group GSM/EDGE Radio Access Network, General Packet Radio Service (GPRS), Mobile Station (MS)—Base Station System (BSS) interface, Radio Link Control/ Medium Access Control (RLC/MAC) protocol (Release 5), , France, Sep. 2004.

3GPP TS 45.002 v5.12.03$^{rd}$ Generation Partnership Project (3GPP) : Technical Specification Group GSM/EDGE Radio Access Network, Multiplexing and multiple access on the radio path (Release 5), , France, Apr. 2004.

\* cited by examiner

METHOD AND SYSTEM FOR UPLINK ESTABLISHMENT IN A WIRELESS CELLULAR COMMUNICATION

TECHNICAL FIELD OF THE INVENTION

The present invention relates to wireless communications. More especially it relates to wireless packet data communications. Particularly it relates to reduction of delay when setting up an uplink communications channel.

BACKGROUND AND DESCRIPTION OF RELATED ART

Multiplexing of a plurality of users on a common resource is well known in prior art. FDM (Frequency Division Multiplex), TDM (Time Division Multiplex) and CDM (Code Division Multiplex) are well known examples of multiplexing principles.

Also a number of queuing disciplines are known for scheduling traffic on the multiplexed resource.

Kenth Fredholm, Kristian Nilsson, 'Implementing an application for communication and quality measurements over UMTS networks,' LiTH-ISY-EX-3369-2003, Linköping 2003, describes simulations of voice over IP (Internet Protocol) in UMTS (Universal Mobile Telecommunications System). The master thesis includes concepts such as QoS (Quality of Service), AMR (Adaptive Multi Rate), RTP (Real-time Transport Protocol), RTCP (Real-time Transport Control Protocol) and SIP (Session Initiation Protocol).

AMR can operate at various bit rates including, e.g., 12.2 and 4.75 kbit/s. Background noise is produced at 1.8 kbit/s. An AMR frame comprises an AMR header, AMR auxiliary information and an AMR core frame.

The AMR header comprises
  frame type, and
  frame quality indicator.
The AMR auxiliary information comprises
  mode indication,
  mode request, and
  CRC parity bits.
The AMR core frame comprises comfort noise data or speech data divided into three classes of data bits,
  Class A,
  Class B, and
  Class C.

Comfort noise is transmitted in Class A bit field. Speech data classified in Class A bits are bits considered most important and Class C bits least for a resulting (decoded) speech quality. In UMTS, SCR (Source Controlled Rate) operation is mandatory for AMR and controls transmission data rate.

Figure 1:
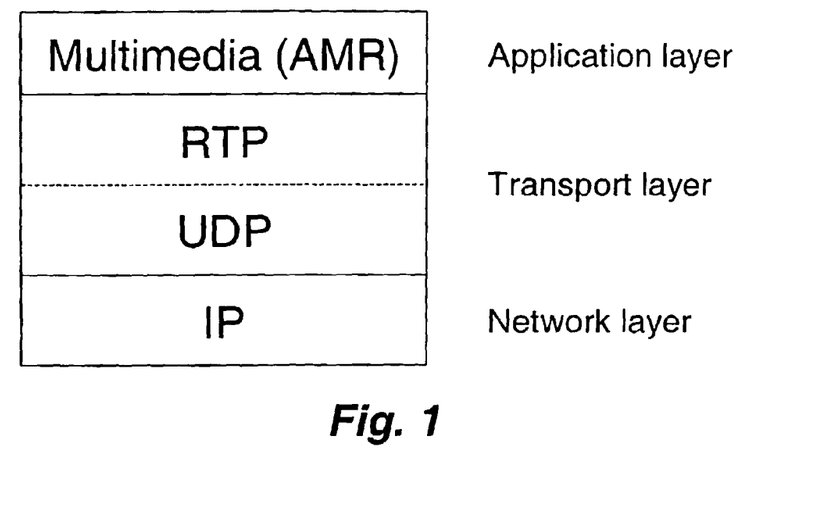
FIG. 1 illustrates in principle a protocol stack with RTP, UDP and IP transport and network protocol layers carrying a multimedia application according to prior art.

RTP supports various lower level protocols but typically runs over UDP (User Datagram Protocol) as illustrated in FIG. 1. Both RTP and UDP are generally referred to as protocols of transport layer in a protocol stack as that in FIG. 1. AMR frames of a multimedia application, in the application layer, are sent in RTP packets. FIG. 3.2 in the master thesis illustrates an overview of initiation of an end-to-end communications session between two AMR enabled phones over a UMTS network.

Hossam Fattah, Cyril Leung, 'An Overview of Scheduling Algorithms in Wireless Multimedia Networks,' IEEE Wireless Communications, pp. 76-83, June 2002 describes a plurality of scheduling algorithms and among other things scheduling in CDMA networks. One algorithm, Scheduled CDMA, reveals data exchange between BS and MS in fixed-size unit called capsule, comprising one or more packets. For uplink scheduling, a capsule transmission request is sent to base station by mobile station whenever the MS has new packets to transmit. For each time slot the scheduler selects capsule transmission requests from a common queue ordered according to priority or delay sensitivity. The base station sends transmission permission capsules to selected mobile stations to inform them of their capsule transmission times and power levels.

U.S. Patent Application US2004/0184461 reveals a packet-switched data network providing streaming mode service, such as a GPRS network providing VSS (Voice Streaming Service), includes a server assisting the VSS, a VSS server. The VSS server gathers information about the functioning of the packet-switched network and communications conditions in the various parts of the network. When a terminal A connected to the network wants to establish a voice connection with a second terminal B, it receives, during the connection set-up, information from its base station concerning the link between the base station and the terminal A. The information is used for selecting appropriate operating mode, store-and-play mode or streaming mode.

$3^{rd}$ Generation Partnership Project (3GPP): *Technical Specification Group Core Network, Mobile radio interface layer 3 specification*, (Release 1998), 3GPP TS 04.08 v7.21.0, France, December 2003, specifies procedures for Radio Link Control, RLC, and specifies the procedures used at the radio interface for Call Control, CC, Mobility Management, MM, Radio Resource, RR, management and Session Management, SM. Paragraph 3.5.2.1.2 describes initiation of packet access procedure and channel request. A mobile station initiates a packet access procedure by scheduling sending of CHANNEL REQUEST messages on RACH and leaving the packet idle mode. The RR entity of the mobile station schedules CHANNEL REQUEST messages on RACH.

$3^{rd}$ Generation Partnership Project (3GPP): *Technical Specification Group GSM/EDGE Radio Access Network, General Packet Radio Service (GPRS), Mobile Station (MS)—Base Station System (BSS) interface, Radio Link Control/Medium Access Control (RLC/MAC)protocol*, (Release 1999), 3GPP TS 04.60 v8.25.0, France, September 2004, specifies the procedures used at the radio interface (Reference Point Um) for the General Packet Radio Service, GPRS, Medium Access Control/Radio Link Control, MAC/RLC, layer. The present document provides the overall description for RLC/MAC layer functions of GPRS and EGPRS (General Packet Radio Service and Enhanced General Packet Radio Service) radio interface Um. Within this TS the term GPRS refers to GPRS and EGPRS unless explicitly stated otherwise. Paragraph 7.1.2.1.1 relates to access persistence control on PRACH. The PRACH Control Parameters IE contains the access persistence control parameters and shall be broadcast on PBCCH (Packet Broadcast Control Channel) and PCCCH (Packet Common Control Channel). The parameters included in the PRACH Control Parameters IE are:

MAX_RETRANS, for each radio priority i(i=1, 2, 3, 4);
  PERSISTENCE_LEVEL, which consists of the PERSISTENCE_LEVEL P(i) for each radio priority i (i=1, 2, 3, 4), where P(i)∈{0, 1 . . . 14, 16}. If the PRACH Control Parameters IE does not contain the PERSISTENCE_LEVEL parameter, this shall be interpreted as if P(i)=0 for all radio priorities;
  S used to determine next TDMA frame; and
  TX_INT, the value, T, of which is used to determine next TDMA frame.

The mobile station shall make maximally M+1, where M is received value of parameter MAX_RETRANS for a particular priority, attempts to send a PACKET CHANNEL REQUEST (or EGPRS PACKET CHANNEL REQUEST) message. After sending each PACKET CHANNEL REQUEST (or EGPRS PACKET CHANNEL REQUEST) message, the mobile station shall listen to the full PCCCH (corresponding to its PCCCH_GROUP).

The mobile station shall start timer T3186 at the beginning of the Packet Access Procedure. At expiry of timer T3186, the packet access procedure shall be aborted, packet access failure shall be indicated to upper layers and the mobile station shall return to packet idle mode. The first attempt to send a PACKET CHANNEL REQUEST (or EGPRS PACKET CHANNEL REQUEST) message, may be initiated at the first available PRACH block on the PDCH defined by the PCCCH_GROUP for the mobile station. The mobile station shall choose one of the four TDMA frames within the selected PRACH block randomly with a uniform probability distribution. For each attempt, the mobile station shall draw a random value R with uniform probability distribution in the set {0, 1, . . . 15}. The mobile station is allowed to transmit a PACKET CHANNEL REQUEST message if P(i), where i is the radio priority of the TBF being established, is less than or equal to R. After each attempt, the S and T parameters are used to determine the next TDMA frame in which it may be allowed to make a successive attempt. The number of TDMA frames belonging to the PRACH on the PDCH defined by the PCCCH_GROUP for the mobile station between two successive attempts to send a PACKET CHANNEL REQUEST (or EGPRS PACKET CHANNEL REQUEST) message excluding the TDMA frames potentially containing the messages themselves is a random value drawn for each transmission with uniform probability distribution in the set {S, S+1, . . . , S+T−1}. Paragraph 8.1.2.5 describes uplink TBF establishment during downlink RLC data block transfer. The mobile station may request establishment of an uplink transfer during a downlink TBF by including a Channel Request Description information element in the PACKET DOWNLINK ACK/NACK message. Initiation is triggered by a request from upper layers for transfer of an LLC PDU. The request from upper layers specifies a Radio Priority to be associated with the packet transfer. Upon such a request,    if access to the network is allowed, the mobile station initiates the packet access procedure.

otherwise, the RR sub-layer in the mobile station rejects the request.

The mobile station initiates the packet access procedure by sending the Channel Request Description information element in a PACKET DOWNLINK ACK/NACK message on the PACCH and starting a timer.

3GPP TS 44.060 describes an alternative to the procedure in specifications 3GPP TS 04.08 and 3GPP TS 04.60.

$3^{rd}$ Generation Partnership Project (3GPP): *Technical Specification Group GSM/EDGE Radio Access Network, General Packet Radio Service (GPRS), Mobile Station (MS)—Base Station System (BSS) interface, Radio Link Control/Medium Access Control (RLC/MAC) protocol (Release 5)*, 3*GPP TS* 44.060 *v*5.13.0, *France, September* 2004, specifies procedures for Radio Link Control, RLC, layer and Medium Access Control, MAC, layer, including physical link control functions of the radio interface between GSM/EDGE Radio Access Network, GERAN, and Mobile Station, MS. An Uplink State Flag, USF, is used on Packet Data Channel(s), PDCH(es) to allow multiplexing of uplink radio blocks from different mobile stations. An RR (Radio Resource) connection is a physical connection established between a mobile station and the network to support exchange of information flows. A TBF (Temporary Block Flow) is, in A/Gb mode, a physical connection used by the two RR peer entities to support the unidirectional transfer of LLC (Logical Link Control) PDUs on packet data physical channels. (A/Gb mode is a mode of operation of the MS when connected to the Core Network, CN, via GERAN and the A and/or Gb interfaces; the A interface being the interface between a BSS (Base Station Subsystem) and a 2G MSC (Mobile Switching Center) and the Gb interface being the interface between a BSS and a 2G SGSN (Serving GPRS Support Node).) In Iu mode, a TBF is a logical connection offered by two MAC entities to support the unidirectional transfer of RLC PDUs on basic physical sub-channels. (Iu mode is a mode of operation of the MS when connected to the CN via GERAN or UTRAN and the Iu interface; the Iu interface being the interface between a BSS or an RNC (Radio Network Controller) and a 3G MSC or a 3G SGSN.) In extended uplink TBF mode, the uplink TBF may be maintained during temporary inactive periods, where the mobile station has no RLC information to send.

The mobile station shall initiate a packet access procedure by scheduling sending of PACKET CHANNEL REQUEST messages on PRACH (Packet Random Access Channel) corresponding to its PCCCH_GROUP (Packet Common Control Channel Group) and simultaneously leaving the packet idle mode. While waiting for a response to the PACKET CHANNEL REQUEST message, the mobile station shall monitor the full PCCCH (Packet Common Control Channel) corresponding to its PCCCH_GROUP. While monitoring the full PCCCH, the mobile station shall decode any occurrence of the PERSISTENCE_LEVEL parameter included in a message received on PCCCH. When the mobile station receives the PERSISTENCE_LEVEL parameter, the value of the PERSISTENCE_LEVEL parameter shall be taken into account at the next PACKET CHANNEL REQUEST attempt that follows. The parameter PERSISTENCE_LEVEL comprises a persistence level P(i) for each radio priority i (i=1, 2, 3, 4); where P(i) ∈ {0, 1 . . . 14, 16}. The first attempt to send a PACKET CHANNEL REQUEST (or EGPRS PACKET CHANNEL REQUEST) message, may be initiated at the first available PRACH block on the PDCH (Packet Data Channel) defined by the PCCCH_GROUP for the mobile station. The mobile station shall choose one of four TDMA frames within the selected PRACH block randomly with a uniform probability distribution. For each attempt, the mobile station shall draw a random value R with uniform probability distribution in the set (0, 1 . . . 15). The mobile station is allowed to transmit a PACKET CHANNEL REQUEST message provided that P(i) is less than or equal to R. Consequently, the smaller P(i), the greater is the persistency.

The mobile station generally operates with a sliding transmission window of RLC data PDUs. In the extended uplink TBF mode of Technical Specification 3GPP TS 44.060, if there is no RLC data block available within the window, the mobile station shall stop sending RLC data blocks. The mobile station shall continue sending RLC data blocks when an RLC data block becomes available in the window.

A UMTS correspondence of TBFs in GSM/GPRS and GSM/EGPRS are RABs (Radio Access Bearers).

$3^{rd}$ Generation Partnership Project (3GPP): *Technical Specification Group GSM/EDGE Radio Access Network, Multiplexing and multiple access on the radio path (Release 5)*, 3*GPP TS* 45.002 *v*5.12.0, *France, April* 2004, defines the physical channels of the radio sub system required to support the logical channels. It includes a description of the logical channels and the definition of frequency hopping, TDMA (Time Division Multiple Access) frames, time-slots and bursts. In the uplink part for channels other than PACCH (Packet Associated Control Channel) transmitted as access bursts on PRACH (Packet Random Access Channel) or CPRACH (Compact Packet Random Access Channel), the logical channel type shall be indicated by the message type contained in the block header part. For PACCH transmitted as access bursts, the logical channel type is indicated by the corresponding polling message on the downlink. For the PRACH or CPRACH case the logical channel type is indicated by the USF, set on the downlink on a block-by-block basis.

The MAC layer is responsible for sharing of communications resource (the air interface) common to data and voice users, according to an allocation strategy.

In e.g. GSM/GPRS, MAC of BSS (Base Station Subsystem) is responsible for management of uplink and downlink scheduling of RLC blocks belonging to different TBFs over available time slots, resolving conflicts due to e.g. request collisions, assigning uplink TBFs to requesting MTs (Mobile Terminals) if there are time-slots available, notifying of uplink TBF deallocation if MT has been inactive during a predefined period, associating respective voice calls to a pair of time-slots and signaling as need be for deallocating of a TBF to render the time-slot pair available for speech communications. In uplink direction, MAC of MT is responsible for initiating transmission of requests of uplink TBFs to BSS for transfer of data for which no TBF is yet established. Once the TBF setup is acknowledged, MAC of MT forwards RLC PDUs, carrying one or more segmented LLC PDUs, over a time-slot allocated by BSS. MT continues sending until there is no more data to send, or it has transmitted a maximum number of RLC blocks allowed. The TBF is then released. Each TBF is assigned by the network a temporary flow identity, TFI, which is unique in both directions.

Figure 2:
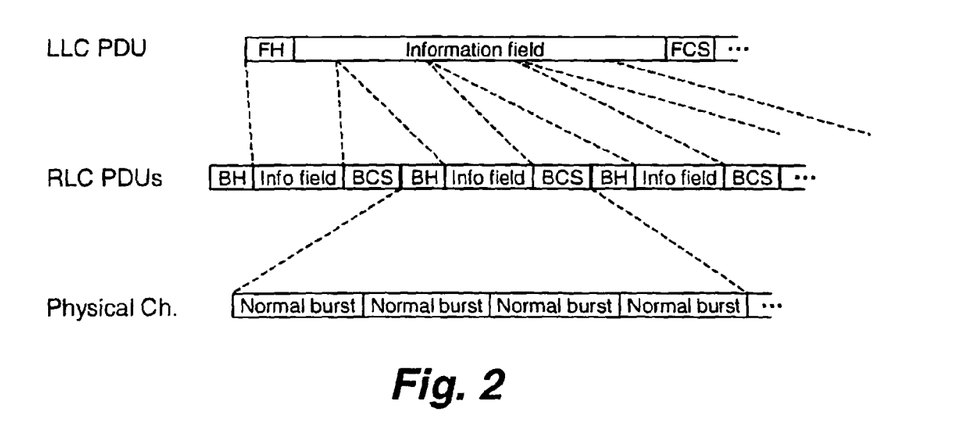
FIG. 2 demonstrates schematically segmentation/reassembly of LLC PDUs and RLC PDUs according to prior art.

FIG. 2 illustrates schematically segmentation/reassembly of LLC PDUs and RLC PDUs. The LLC PDU comprises a frame header <<FH>>, LLC data or control information <<Information fields, and a frame check sequence <<FCS>>. A radio block consists of a 1-byte MAC header <<BH>> followed by RLC data <<Info field>>, or an RLC/MAC control block <<Info field>>, finalized by a 16-bit block check sequence, <<BCS>>. The radio block is carried on the physical channel by four normal bursts.

None of the cited documents above discloses allowing Channel Requests to be sent immediately when a mobile station initiates setup of a PS connection.

SUMMARY OF THE INVENTION

A general problem of multiple access systems is to fulfill various requirements of a session as regards, e.g. QoS. Another problem is how to incorporate such requirements when allocating traffic to communications resources and scheduling of transmission instances.

In multi-user access, delay or latency is often of vital importance. The demand for short delay or low latencies are immediate when real-time applications, e.g. speech, are provided over packet switched connections. One such example application is Push-to-talk over Cellular, PoC.

Generally, this is particularly a problem in uplink direction when a user e.g. does not get any response of a button press until after a delay, or cannot get his voice message through during a conversation despite the other party has stopped talking waiting for a response. Remembering that in typical existing systems, it is the network side of a wireless connection that is responsible for the TBF establishment.

Consequently, there is a need of efficiently providing uplink communications channel scheduling and establishment of packet data transmissions for users, temporarily being in inactive state in terms of wireless transmissions, entering active state.

An object of the invention is to reduce time required for uplink communications channel establishment when user equipment or user enters an active state.

Another object is to provide deterministic channel request time for TBF set-up.

It is also an object to provide a method and system for efficiently scheduling and establishing uplink TBF, or corresponding occurrences for the various communications systems.

A further object is to provide a method and system of uplink communications channel and establishment rendering PoC useful.

Finally, it is an object to provide a method and system of packet switched uplink communications channel establishment independent of delay timer.

These objects are met by a method and system of uplink scheduling or uplink communications channel establishment and associated signaling.

DESCRIPTION OF PREFERRED EMBODIMENTS

For delay sensitive applications it is important with low latency.

In multi-user access, delay or latency is often of vital importance. The demand for short delay or low latencies are immediate when real-time applications, e.g. speech, are provided over packet switched connections. One such example application is Push-to-talk over Cellular, PoC.

Toll quality of, e.g., PoC requires delay reduction. The invention provides such delay reduction. It will also improve e.g. web-browsing over cellular.

The invention identifies that if a user equipment or user does not utilize established TBF(s), the TBF(s) are released according to release criteria, known in the art and need be initiated anew. The initiation involves sending of one or more channel request messages. Delay and latency can be reduced if time required for channel request can be reduced. In this respect prior art solutions comprises excessively delayed TBF establishment.

To further reduce delay and latency, according to the invention the transmission scheduling is preferably persistent. USF flags are then sent more frequently than with regular transmission scheduling, this increases the requirements on the mobile station to actively being capable of receiving the scheduling information, thereby to some extent increasing power consumption as compared to a case when the invention is applied with less preferred regular non-persistent scheduling, even if optimized. An advantage achieved is that an entity of user equipment or a user then can send a greater number of blocks at once, without having to wait for potentially other entities of user equipment.

Generally, the delayed uplink TBF establishment of prior art is particularly a problem in uplink direction. In downlink direction, a base station transmits data to a plurality of users and resources can efficiently be allocated and scheduled in relation to information available at sender side (without propagation time delay to a wireless user equipment).

When a user equipment or user becomes inactive, not transmitting data but possibly receiving data, an earlier established TBF for the transmission of data is released unless new data arrives during a time frame in order of seconds.

If the user equipment or user becomes active after this time frame and data then arrives, the TBF needs be established anew. The establishment takes time. It is identified that mean delay can be reduced by approximately 60-113 milliseconds by TBF establishment and scheduling according to the invention. With two parties involved in a conversation over similar connections the perceived effect is doubled. The effect is clearly noticeable. This is particularly the case, e.g., for speech communication in PoC and when web-browsing over cellular.

The invention identifies that packet switched connections and TBF establishment are initiated with a channel request in terms of a Channel Request message sent by user equipment. A channel request is also required for circuit switched connections. According to the invention, for circuit switched connections a channel request message is not sent until a randomly distributed delay times out, but for packet switched connections, the channel request message is sent immediately without waiting a time corresponding to the randomly distributed time delay, when communicating over a cellular radio communications system.

The invention relies on the fact that for a circuit switched connection, there is normally only one connection set up for an entire communications session, e.g. a phone call. The time delay of the call set up is increased by the random time delay, typically in the range 0-226 milliseconds, which would hardly be noticeable to a user. By using a random delay, conflicts of simultaneous channel requests from different users are resolved. Also, if two initial channel request messages coincide in time, a repeated channel request would most probably not coincide and connections could be established.

For packet switched connections, however, it is observed that more than one channel request message is often required for a communications session as perceived by a user. Example communication sessions include web browsing and push to talk communications.

When web browsing, a user may be interrupted or become busy reading acquired information. When the user has finished reading or for any reason becomes active again, TBF establishment may be required anew, depending on whether the earlier established TBF has been released or not (depending on time lapsed since the earlier acquired information was requested). In most systems the TBF is released after a time frame in the range of seconds, e.g. 1.5 s. In case of a packet switched connection, the delay reduction is preferred to the reduced risk of collision, as a user or user application sending, e.g., a request anew would be less annoying to most users than a great latency and long response times.

A similar reasoning holds for an example push to talk communications session. In an example situation illustrating the invention, a first TBF/packet switched connection has been established for a first user presenting his information over a packet switched connection in a cellular radio communications system to one or more users receiving the information, the receiving users then responding to the received information. If the first user then wants to provide additional information the duration of the one or more responses may exceed the predefined time for TBF release of the first user and a TBF has to be established anew when the first user wants to provide additional information. Consequently, a TBF has to be established anew for the first user to provide the information. It is concluded that for most users a reduced time delay is preferred to a reduced risk of collision, as the risk of collision is small and the inconvenience of a collision (even if unlikely) is generally preferred to a great delay and latency, at least if the latency is sufficiently small such that a collision, even if unlikely, becomes apparent to the user or user application very fast.

When the invention is applied to a GSM system, a preferred embodiment of the invention controls timer T3120 of 3GPP specifications to comprise a random delay time for circuit switched connections and to be predefined to zero for packet switched connections. According to another embodiment the timer T3120 always comprises a random delay time, however the timer is applied for circuit switched connections but not for packet switched connections. The time delay of TBF establishment can thereby be reduced by typically 60-113 milliseconds as compared to the delay of a channel request message for a circuit switched connection of an average user.

Figure 3:
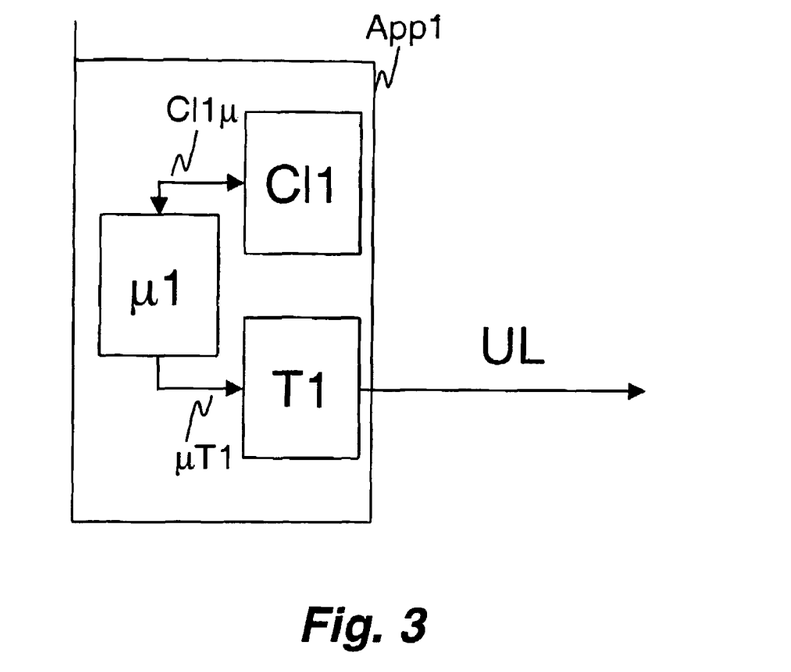
FIG. 3 illustrates a block diagram of an apparatus according to a first embodiment of the invention.

FIG. 3 illustrates a block diagram of an apparatus <<App1>> according to a first embodiment of the invention. Processing means <<µ1>> initiates one or more uplink UL>> TBFs, transceiver means <<T1>> thereupon transmitting one or more channel request messages, as need be after verifying <<C11>> that a timer <<C11>> has lapsed. The timer C11>> also provides <<C11>> timing information for channel requests when initiating a circuit switched connection. The timer <<C11>> provides delays determined differently depending on whether the connection is a circuit switched connection or a packet switched connection. Preferably the delay provided <<C11µ>> by the timer <<C11>> equals zero for packet switched connections. For circuit switched connections the timer preferably provides a pseudo-random delay time. Preferably the pseudo-random delay time is rectangularly distributed, i.e. has a rectangular probability density function or a rectangular probability distribution for quantized delay values.

Figure 4:
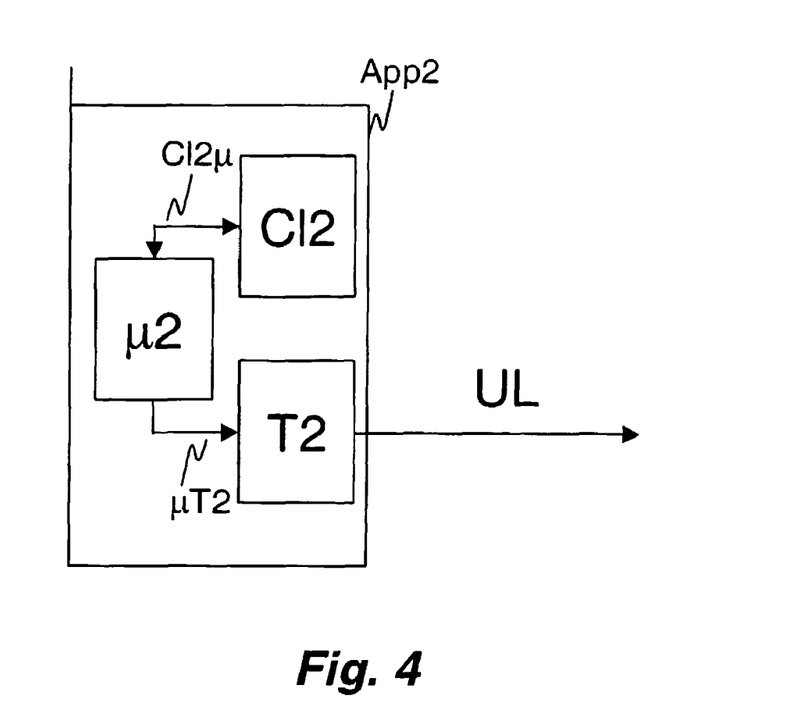
FIG. 4 illustrates a block diagram of an apparatus according to a second embodiment of the invention.

FIG. 4 illustrates a block diagram of an apparatus <<App2>> according to a second embodiment of the invention. A timer <<C12>> provides <<C12µ>> timing information to processing means <<µ>> for channel request as requested <<C12µ>> when initiating a circuit switched connection. Transmitter means <<T2>> thereupon transmits one or more channel request messages. The timer preferably provides a pseudo-random delay time. Preferably the pseudo-random delay time is rectangularly distributed. Processing means <<p2>> initiates one or more uplink <<UL>>TBFs or packet switched connections, by transceiver means <<T2>> transmitting one or more channel request messages, with no verifying <<C12µ>> that a timer <<C12>> has lapsed.

In this patent application acronyms such as IP, UDP, RTP, SIP, TBF, RAB, BSS, MT, MS, GSM, GPRS, EGPRS, UMTS or CDMA2000 are applied. However, the invention is not limited to systems with entities with these acronyms, but holds for all communications systems operating analogously.

The invention is not intended to be limited only to the embodiments described in detail above. Changes and modifications may be made without departing from the invention. It covers all modifications within the scope of the following claims.

The invention claimed is:

1. A method of uplink establishment in wireless cellular communications, the method comprising:
    delaying, using a processor, a connection initiation depending on connection type, further comprising
        delaying, using the processor, by a random distributed delay, a channel request message for circuit switched connections, wherein
            the random distributed delay further comprises a pseudo-random time delay for circuit switched connections, and
            the pseudo-random time delay has a rectangular probability density function or a rectangular probability distribution, and
        sending, using the processor, a channel request message for packet switched connections without delay.

2. The method according to claim 1 characterized in that the cellular communications system is a Global System for Mobile Communications (GSM) system with General Packet Radio Service (GPRS) or Enhanced General Packet Radio Service (EGPRS).

3. The method according to claim 2, wherein timer T3120 is disregarded for packet switched connections.

4. The method according to claim 2, wherein timer T3120 is set equal to zero for packet switched connections.

5. An apparatus of uplink establishment in wireless cellular communications, the apparatus comprising:
    means for delaying a connection initiation depending on connection type, further comprising
        means for delaying, by a random distributed delay, a channel request message for circuit switched connections, and
        means for sending a channel request message for packet switched connections without delay; and
    a timer for generating a pseudo-random time delay for circuit switched connections, wherein
        the pseudo-random time delay has a rectangular probability density function or a rectangular probability distribution.

6. The apparatus according to claim 5, further comprising a timer for generating a pseudo-random time delay for circuit switched connections and for not generating the time delay for packet switched connections.

7. The apparatus according to claim 5, wherein the cellular communications system is a Global System for Mobile Communications (GSM) system with General Packet Radio Service (GPRS) or Enhanced General Packet Radio Service (EGPRS).

8. The apparatus according to claim 7, wherein timer T3120 is disregarded for packet switched connections.

9. The apparatus according to claim 7, wherein timer T3120 is set equal to zero for packet switched connections.

10. The apparatus according to claim 5, wherein the apparatus is included in or is user equipment or a mobile station.

* * * * *

UNITED STATES PATENT AND TRADEMARK OFFICE
CERTIFICATE OF CORRECTION

PATENT NO. : 8,144,610 B2
APPLICATION NO. : 11/910845
DATED : March 27, 2012
INVENTOR(S) : Sundberg It is certified that error appears in the above-identified patent and that said Letters Patent is hereby corrected as shown below:

On the Title Page, in Item (56), under "OTHER PUBLICATIONS", in Column 2, Line 1, delete ""improvement" and insert -- "Improvement --, therefor.

On the Title Page, in the Figure, delete " $Cl1\mu$ " and insert -- $C11\mu$ --, therefor.

On the Title Page, in the Figure, delete " $Cl1$ " and insert -- $C11$ --, therefor.

On Title Page 2, in Item (56), under "OTHER PUBLICATIONS", in Column 2, Line 5, delete "(Release 5), ," and insert -- (Release 5), --, therefor.

On Title Page 2, in Item (56), under "OTHER PUBLICATIONS", in Column 2, Line 9, delete "(Release 5), ," and insert -- (Release 5), --, therefor.

In Fig. 3, Drawing Sheet 2 of 2, delete " $Cl1\mu$ " and insert -- $C11\mu$ --, therefor.

In Fig. 3, Drawing Sheet 2 of 2, delete " $Cl1$ " and insert -- $C11$--, therefor.

In Fig. 4, Drawing Sheet 2 of 2, delete " $Cl2\mu$ " and insert -- $C12\mu$ --, therefor.

In Fig. 4, Drawing Sheet 2 of 2, delete " $Cl2$ " and insert -- $C12$ --, therefor.

In Column 5, Line 37, delete "<<Information fields," and insert -- <<Information field>>, --, therefor.

In Column 6, Line 35, delete "DESCRIPTION OF PREFERRED" and insert -- DETAILED DESCRIPTION OF THE PREFERRED --, therefor.
In Column 8, Line 27, delete "UL>>" and insert -- <<UL>> --, therefor.

Signed and Sealed this
Twelfth Day of February, 2013

Teresa Stanek Rea
*Acting Director of the United States Patent and Trademark Office*

In Column 8, Line 30, delete "<<C11>>" and insert -- <<C11μ>> --, therefor.

In Column 8, Line 30, delete "C11>>" and insert -- <<C11>> --, therefor.

In Column 8, Line 31, delete "<<C11>>" and insert -- <<C11μ>> --, therefor.

In Column 8, Line 53, delete "<<p2>>" and insert -- <<μ2>> --, therefor.